Patented Dec. 1, 1936

2,062,873

UNITED STATES PATENT OFFICE 2,062,873

DIAZO COMPOSITION

Lawrence H. Flett, Hamburg, N. Y., assignor to National Aniline & Chemical Company, Inc., New York, N. Y., a corporation of New York No Drawing. Application April 14, 1934, Serial No. 720,572

8 Claims. (Cl. 23—250)

This invention relates to the production of solid stable diazo compositions. It relates more particularly to improvements in the method of drying and/or stabilizing diazo compositions containing diazonium compounds in combination with metal halides or aryl-sulfonic acids, and to the resulting compositions.

In the dyeing of textile fibers by the so-called "ice color" process and certain printing processes, a diazotized aromatic amine or suitable derivative thereof (such as may be obtained by diazotizing a primary aromatic amine, amino azo compound or amino polyazo compound which contains one or more primary amino groups and which may be further substituted by one or more halogen atoms and/or alkyl, nitro, alkoxy, alkylamino, acylamino, arylamino, etc. groups) is coupled with a suitable coupling component or so-called developer in the presence of the fiber to be dyed. It has heretofore been proposed to supply the dyer with the diazotized aromatic amine (the so-called "diazo compound") in the solid form, which may be employed in the dyeing or printing process, and thereby obviate the necessity of preparation of the diazo compound by the dyer. While some of the diazonium compounds resulting from the diazotization of the aromatic amines are in themselves insoluble in the diazotization reaction mixture and separate therefrom in the form of somewhat stable products (diazonium salts of inorganic acids), in many cases the diazonium compounds do not separate and/or are unstable. It has therefore been proposed to produce stabilized diazo compositions from diazotized aromatic amines and positions from diazotized aromatic amines and suitable derivatives thereof (such as those hereinbefore mentioned) by forming a double or mixed salt or addition compound of the diazonium compound and one or more salts of a heavy metal (as for example, the chloride, bromide, iodide or fluoride of zinc, tin, copper, platinum, mercury, gold, cadmium, etc.) or by forming a salt or double or mixed compound or addition compound of the diazonium compound and one or more aromatic sulfonic acids (or metal salts thereof). Owing, however, to the unstable, and in some cases explosive, nature of many of the said diazo salts, addition and mixed product, the drying and grinding of them is often extremely hazardous.

According to one feature of the present invention, an anhydrate of magnesium sulfate, and especially a partial hydrate of magnesium sulfate, is employed to stabilize the said diazo salts, addition and/or mixed products. (The term "anhydrate of magnesium sulfate" is employed to designate generically anhydrous magnesium sulfate, $MgSO_4$, and those partial hydrates and mixtures which contain some combined water but less than is present in $MgSO_4.7H_2O$.) According to another feature of the present invention, an anhydrate of magnesium sulfate, and especially a partial hydrate of magnesium sulfate, is employed as a drying agent for said diazo salts, addition and/or mixed products. According to a further feature of the present invention, alums are incorporated into compositions containing the said diazo salts, addition and/or mixed products and an anhydrate of magnesium sulfate. I have found that the anhydrates of magnesium sulfate are satisfactory drying and stabilizing agents for the said diazo compounds, and that the stability of the resulting compositions is greater when a partial hydrate of magnesium sulfate is employed as the drying agent than when anhydrous magnesium sulfate is employed as the drying agent. I have further found that alums, such as $K_2Al_2(SO_4)_4.24H_2O$, and crystallized aluminum sulfate, $Al_2(SO_4)_3.18H_2O$, serve not only as stabilizing agents for all diazo compounds but also, when they are incorporated into many diazo compositions containing an anhydrate of magnesium sulfate, the resulting compositions give improved dyeings when coupled with coupling components. Thus, I have found that a solid diazo composition of the said type in a wet or moist condition, as for example, a mixed or double halide of a heavy metal and a diazonium compound in the form of a filter cake resulting from the filtration of an aqueous suspension thereof, can be readily dried by mixing the filter cake with a totally or partially dehydrated crystallized magnesium sulfate, advantageously the latter, and that the resulting mass may be mixed with alum by grinding without danger of explosion, thereby forming a diazo composition which is stable to moderate heating and which dissolves readily in water to form diazo solutions of the desired acidity for dyeing and producing improved dyeings when coupled with coupling components.

The magnesium sulfate employed in accordance with the present invention may be anhydrous or may be partially hydrated, that is it may contain various amounts of water less than $MgSO_4.7H_2O$. The latter may be produced in various ways; as for example, by partially hydrating anhydrous magnesium sulfate, or by removing a part of its water of crystallization from crystallized magnesium sulfate. (As employed herein, the terms "partial hydrate of magnesium sulfate" and "partially hydrated magnesium sulfate" denote a content of water, based on the weight of anhydrous magnesium sulfate, at least 14 per cent of that present in crystallized magnesium sulfate MgSO₄.7H₂O.) In general, for advantageous results, a partially hydrated magnesium sulfate containing 13 to 30 per cent of water, and more particularly 13 to 23 per cent of water, may be employed in the practice of the present invention. Preferably a partially dehydrated crystallized magnesium sulfate is employed containing 1 to 2 mols of water per mol. of magnesium sulfate, and especially 1 to 1.5 mols of water per mol. of magnesium sulfate.

The invention will be further described in connection with the following specific example which illustrates a manner of practicing the invention. The parts are by weight and the temperatures are in degrees centigrade.

*Example.*—4-nitro-2-aminoanisole is diazotized with sodium nitrite in a suitable acid medium, such as hydrochloric acid; a mixture of zinc and tin chlorides is added to the reaction mixture; and a mixed salt of 4-nitroanisole-2-diazonium chloride, zinc chloride and tin chloride is precipitated in any suitable manner, as by adding magnesium chloride; the temperature being maintained throughout at about 0° to about 5°. The precipitate is filtered off from the mother liquor. 102 parts of a moist press cake produced in this manner and containing the equivalent of 37 parts of 4-nitro-2-aminoanisole, 15 parts of zinc chloride, 1 part of tin chloride, and 25 parts of water, are added slowly with stirring to 40 parts of powdered partially dehydrated crystallized magnesium sulfate (containing 16 to 17 per cent of water based on the weight of MgSO₄) in any suitable mixing vessel. The mixture is stirred until substantially dried, which generally requires about 4 hours. There is thus produced a dry homogeneous mixture containing the mixed chlorides of zinc, tin and the diazonium compound together with magnesium sulfate in the hydrated and partially hydrated forms. The product is a dry solid which may be kept without undergoing decomposition and which may be ground, as for example to produce a powder and/or to mix it with other ingredients necessary or desirable for its utilization, without danger of explosion. For example, there may be thoroughly mixed with the dry mixture 36 parts of fully hydrated alum (crystallized potassium aluminum sulfate) to adjust the acidity to the desired value when the product is dissolved in water and to assist in the solubility of the product, and 7 parts of anhydrous sodium sulfate, thereby producing a composition which is dry, stable, and readily soluble in water.

The mixing vessel employed may be of the usual type comprising an ordinary mixing chamber containing a suitable rotary agitator provided with agitating and mixing arms, blades or the like. The mixing is ordinarily carried out under atmospheric conditions (i. e. without any provisions for heating or cooling) but cooling may be employed if desired. The mixing is preferably continued until a dry, powdered product is obtained.

It will be evident to those skilled in the art that the invention is not limited to the details of the above example nor to the ingredients, proportions, order of steps, and the like, except as indicated in the appended claims. Thus, in the process of the foregoing example the mixed salt containing the chlorides of zinc, tin and the diazonium compound in the form of the moist filter cake can be dried and converted to the final composition containing alum in a single step, if desired; as for example, by directly mixing the moist filter cake with a mixture of the partially dehydrated crystallized magnesium sulfate, alum (crystallized) and anhydrous sodium sulfate. The amounts of anhydrate of magnesium sulfate, alum and sodium sulfate employed may be varied. Preferably sufficient of the anhydrate of magnesium sulfate is employed to dry the mixed diazo salt by taking up as water of crystallization all of the water present. If desired, however, a part of the hydrated magnesium sulfate may be replaced by other suitable water-soluble salts in the anhydrous or partially hydrated forms, as for example, anhydrous or partially hydrated sodium sulfate, aluminum sulfate, etc., but the speed of drying will be reduced. The amount of alum employed may be varied in accordance with the desired acidity and solubility of the final product. Furthermore, other sulfates of aluminum may be used, as for example soda alum, crystallized aluminum sulfate, etc.

Dry, stable, diazo compositions may be produced with the aid of magnesium sulfate in accordance with the present invention from various of the said diazo compounds in a solid form, including diazonium salts of organic sulfonic acids (particularly of aromatic sulfonic acids, and especially of aromatic sulfonic acids of the benzene and naphthalene series), and mixed salts of diazonium compounds with metallic salts (as for example, halides of heavy metals, etc.). The diazo compounds may be derived from any suitable diazotizable aromatic amine, including not only diazotized, unsubstituted, and substituted aromatic primary amines, but also diazotized and tetrazotized amino compounds, amino polyazo compounds, polyamino azo compounds, etc., and more particularly those of the benzene and naphthalene series; as for example, 4-amino - dimethylaniline, 2-dimethylamino-5-amino - benzoic acid, 4-benzoylamino-2.6-diethoxyaniline, benzidine, dianisidine, alpha-aminoanthraquinone, 4.4' - diamino - diphenyl-amine, 4-chlor-2-aminodiphenyl-ether, 4-amino-4'-methoxy-diphenylamine, alpha-naphthylamine, aminoazobenzene, aminoazotoluene, 4-amino - benzene-azo - alpha - naphthylamine, 4-methoxy - benzene - azo-alphanaphthylamine, 2-chlorbenzene-azo-2'-chlor-4'-aminonaphthalene, aminobenzene-azo-benzene-azo-alpha-naphthylamine, benzene-2.5-disulfonic acidazo-4'-amino-naphthalene-6'-sulfonic acid, etc.

The invention is of particular importance in connection with the stabilization and/or drying of mixed diazo metal halide compounds derived from negatively substituted unsulfonated aromatic primary amines, more particularly, those derived from negatively substituted aromatic primary amines of the benzene series which are free from a sulfonic acid and a carboxyl group; as, for example, 3-chloraniline, 2.5-dichloraniline, 4-chlor-2-nitroaniline, 3-nitro-4-amino-toluene, 5-nitro-2-amino-anisole, etc.

Since in the practice of the invention changes may be made in the details of the process and compositions above disclosed without departing from the scope of the invention, it is intended that all matter contained in the above description shall be interpreted as illustrative, and not in a limiting sense. The term "moist" is employed in the claims in its broad sense and includes wet as well as damp material.

It is further to be understood that the following claims are intended to cover, in addition to the generic and specific features of the invention herein described, all statements of the scope of the invention, which, as a matter of language, might be said to fall therebetween.

I claim:

1. A method of drying a diazo composition comprising a diazonium compound in combination with a metal halide or an aryl sulfonic acid which comprises mixing the diazo composition containing moisture with partially dehydrated crystallized magnesium sulfate.

2. A method of making a dry diazo salt composition which comprises dehydrating a diazo salt comprising a mixed halide of a heavy metal and a diazonium compound of the benzene and naphthalene series free from a carboxyl and a sulfonic acid group, by mixing said diazo salt in moist condition with a partial hydrate of magnesium sulfate.

3. A method of making a dry diazo salt composition which comprises dehydrating a diazo salt comprising a mixed chloride of zinc and a diazonium compound of the benzene and naphthalene series containing a negative substituent, but free from a carboxyl and a sulfonic acid group, by mixing said diazo salt in moist condition with a partial hydrate of magnesium sulfate containing 13 to 30 per cent of water, and mixing with fully hydrated alum.

4. A solid diazo composition comprising a homogeneous admixture of a partial hydrate of magnesium sulfate with a diazo composition comprising a diazonium compound in combination with a metal halide or an aryl sulfonic acid.

5. A dry solid diazo composition comprising a homogeneous admixture of a partial hydrate of magnesium sulfate with a mixed halide of a heavy metal and a diazonium compound of the benzene and naphthalene series free from a carboxyl and a sulfonic acid group.

6. A dry solid diazo composition comprising a homogeneous admixture of a partial hydrate of magnesium sulfate with a diazo salt comprising an aromatic sulfonic acid and a diazonium compound of the benzene and naphthalene series free from a carboxyl and a sulfonic acid group.

7. A dry solid diazo salt composition comprising a homogeneous admixture of a partial hydrate of magnesium sulfate, alum and a diazo composition comprising a diazonium compound in combination with a metal halide or an aryl sulfonic acid.

8. A dry solid diazo salt composition comprising a homogeneous admixture of a mixed halide of a diazonium compound and a heavy metal, a partial hydrate of magnesium sulfate, and fully hydrated alum.

LAWRENCE H. FLETT.